United States Patent [19]

Stratton et al.

[11] Patent Number: 4,793,020
[45] Date of Patent: Dec. 27, 1988

[54] NOISE INSULATOR FOR WINDSHIELD WIPER BLADE ASSEMBLY

[75] Inventors: Donald W. Stratton, St. John; Michael A. Bianco, Valparaiso; Gary W. Roadarmel, Michigan City, all of Ind.

[73] Assignee: The Anderson Company of Indiana, Michigan, Ind.

[21] Appl. No.: 50,324

[22] Filed: May 18, 1987

[51] Int. Cl.⁴ .............................................. B60S 1/02
[52] U.S. Cl. ................................. 15/250.42; 181/209
[58] Field of Search ....................... 15/250.32–250.42; 181/207, 208, 209

[56] References Cited

U.S. PATENT DOCUMENTS

| | | | |
|---|---|---|---|
| 1,852,146 | 4/1932 | Carns et al. | 181/207 X |
| 2,876,482 | 3/1959 | Oishei | 15/250.42 |
| 3,114,926 | 12/1963 | Deibel | 15/250.42 |
| 3,193,049 | 7/1965 | Wolleck . | |
| 3,217,832 | 11/1965 | Whitney | 181/208 |
| 3,472,305 | 10/1969 | Lefes | 181/207 X |
| 3,629,898 | 12/1971 | Plisky . | |
| 3,772,730 | 11/1973 | Plisky . | |
| 3,866,262 | 2/1975 | Wubbe . | |
| 4,195,713 | 4/1980 | Hagbjer et al. . | |
| 4,338,148 | 7/1982 | Adell . | |
| 4,345,666 | 8/1982 | Mathou . | |
| 4,346,782 | 8/1982 | Bohm . | |
| 4,418,441 | 12/1983 | Van Den Berg | 15/250.42 |
| 4,437,916 | 3/1984 | Adell . | |

FOREIGN PATENT DOCUMENTS 2174627 11/1986 United Kingdom ............. 15/250.42

Primary Examiner—Peter Feldman
Attorney, Agent, or Firm—Wood, Dalton, Phillips, Mason & Rowe

[57] ABSTRACT

According to the invention, a resilient element is disposed between interconnected elements on a windshield wiper blade assembly such as cooperating primary and secondary yokes and a wiper blade element. Preferably the resilient element is a tape with a pressure sensitive adhesive backing or a coating that can be sprayed or painted on. The invention also comprehends a method of forming the windshield wiping elements by applying the tape or coating to stock material before the individual elements are stamped and formed.

11 Claims, 2 Drawing Sheets

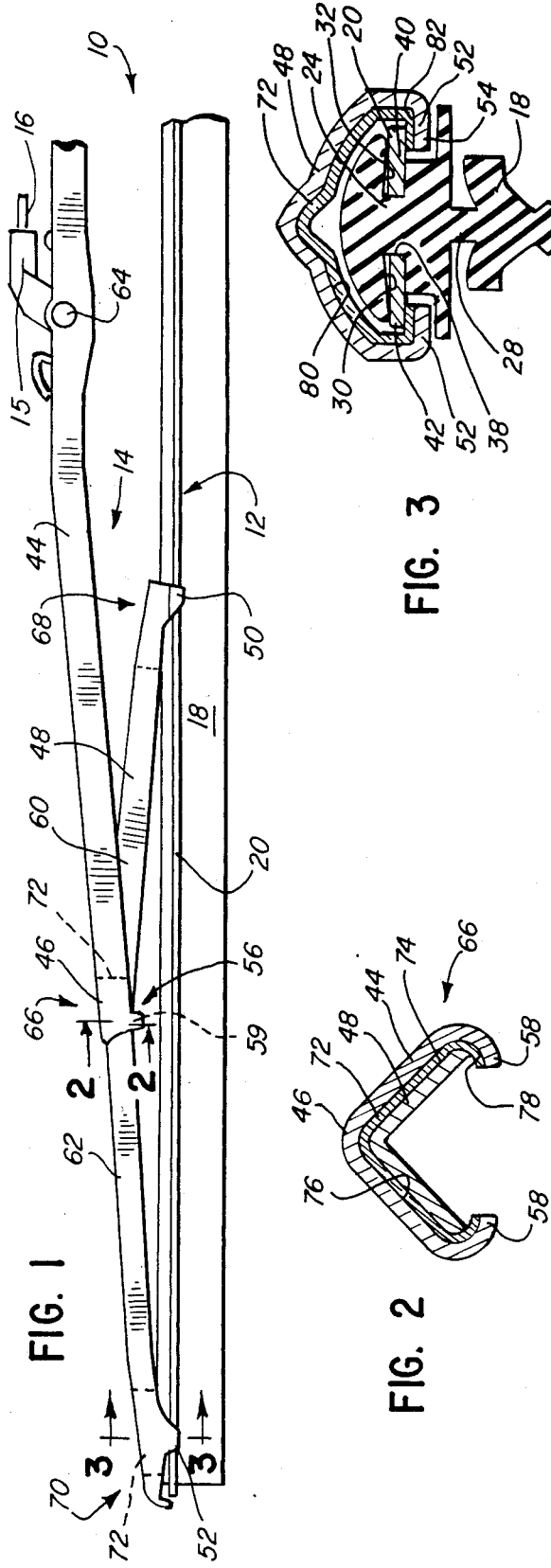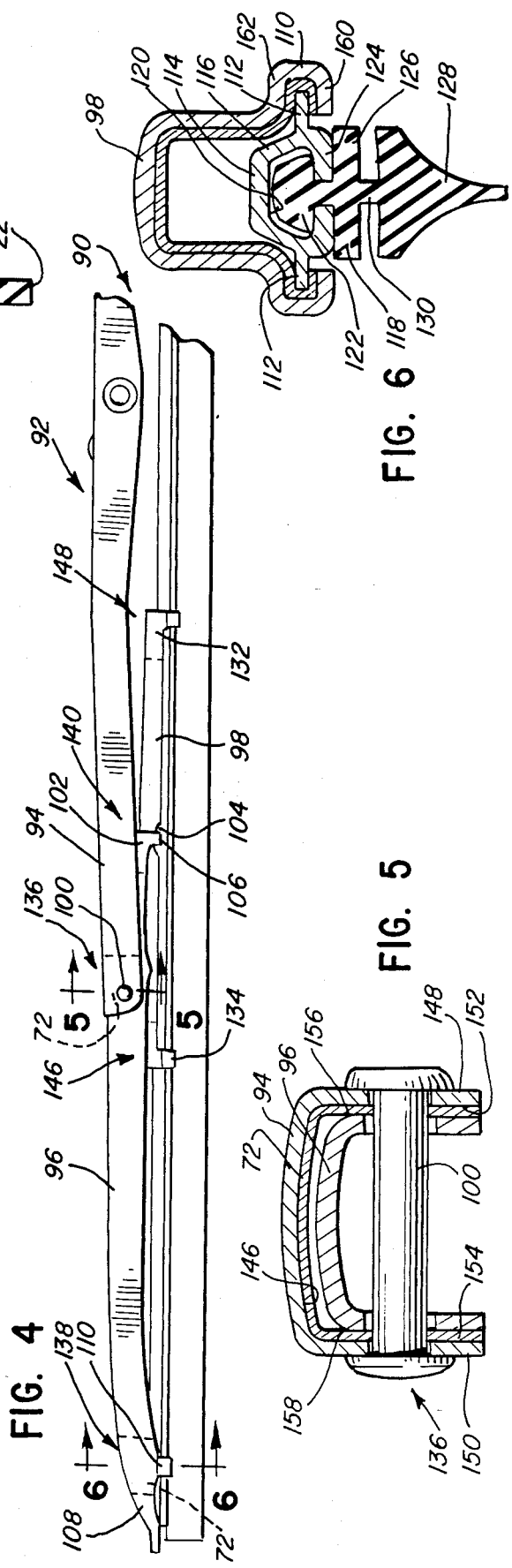

NOISE INSULATOR FOR WINDSHIELD WIPER BLADE ASSEMBLY

BACKGROUND OF THE INVENTION

1. Field of the Invention

This invention relates to windshield wiper blade assemblies and, more particularly, to structure for preventing noise development between interconnected elements on a windshield wiper blade assembly.

2. Description of the Prior Art

A typical windshield wiper blade assembly consists of a wiper arm with a reciprocating drive, a primary yoke pivotally connected to the wiper arm, at least one secondary yoke connected to the primary yoke for movement relative thereto, and a wiper element with a flexor connected to the secondary yoke. At the points of connection between the primary and secondary yokes and between the yokes and the wiper blade flexor, there is metal-to-metal contact. As the wiper blade assembly is operated and the wiper element is conformed to a windshield surface, relative movement occurs between the yokes and between the yokes and flexor resulting in the production of an annoying rattling noise.

One partial solution to the above problem is taught in U.S. Pat. No. 3,629,898 to Plisky. In Plisky, dimples are formed in the primary yoke and define contact points for engagement with the associated secondary yokes. While Plisky's structure represented a substantial improvement over the prior art structures, there is still metal-to-metal contact at the connection between the primary and secondary yokes, even though the area of contact is substantially reduced. Further, Plisky does not address the problem of rattling between the secondary yokes and the blade flexor, at the connections therebetween.

U.S. Pat. No. 3,772,730, to Plisky, also discloses a structure that reduces contact area between connected yokes. Plisky provides a recess on one of the yokes to accept a portion of another, articulated yoke. While Plisky also discloses an effective structure for connecting windshield wiper elements, Plisky also has some metal-to-metal contact and does not disclose any structure for preventing rattling between the secondary yokes and the wiper blade flexor.

SUMMARY OF THE INVENTION

The present invention is specifically directed to overcoming the above enumerated problems in a novel and simple manner.

According to the invention, a resilient or pliable material is disposed between interconnected elements on a windshield wiper blade assembly. The inventive structure is effective in diminishing noise development potentially at all connections between primary yokes, secondary yokes and a flexor of a wiper blade element.

More specifically, a resilient or pliable tape or coating is placed on a surface of one of the elements of a wiper blade assembly so that the tape or coating will be disposed between that surface and a surface on a second element which would normally contact the surface of the one element at the connection between the first and second elements.

Accordingly, connections that would otherwise have metal-to-metal contact areas are cushioned by a sound absorbing or insulating layer so that noise development is substantially diminished over prior art structures.

In a preferred form, the resilient or pliable element is a polyester tape and to facilitate assembly, it has a pressure sensitive adhesive backing.

The sound insulating or sound deadening coating can be sprayed or otherwise applied on at least one of the elements on the same surface as the tape would be placed.

The invention also comprehends a method of applying a sound absorbing material to a metal stock and forming a first windshield wiper element from that stock which formed element is then interconnected with a second windshield wiper element. According to the invention, the tape or coating is applied to the metal stock from which the part is formed before any stamping and forming of the part are carried out.

Alternatively, the tape or coating can be applied after the part is formed, although this is not as conveniently accomplished.

BRIEF DESCRIPTION OF THE DRAWINGS

FIG. 1 is a fragmentary elevation view of a windshield wiper blade assembly having a multi-yoke superstructure with the present invention incorporated;

FIG. 2 is a sectional view of the windshield wiper blade assembly along line 2—2 of FIG. 1;

FIG. 3 is a sectional view of the windshield wiper blade assembly along line 3—3 of FIG. 1;

FIG. 4 is a fragmentary elevation view of a windshield wiper blade assembly with a different multi-yoke superstructure with the present invention incorporated;

FIG. 5 is a sectional view of the windshield wiper blade assembly along line 5—5 of FIG. 4;

FIG. 6 is a sectional view of the windshield wiper blade assembly along line 6—6 of FIG. 4;

DESCRIPTION OF THE PREFERRED EMBODIMENT

Figure 7:
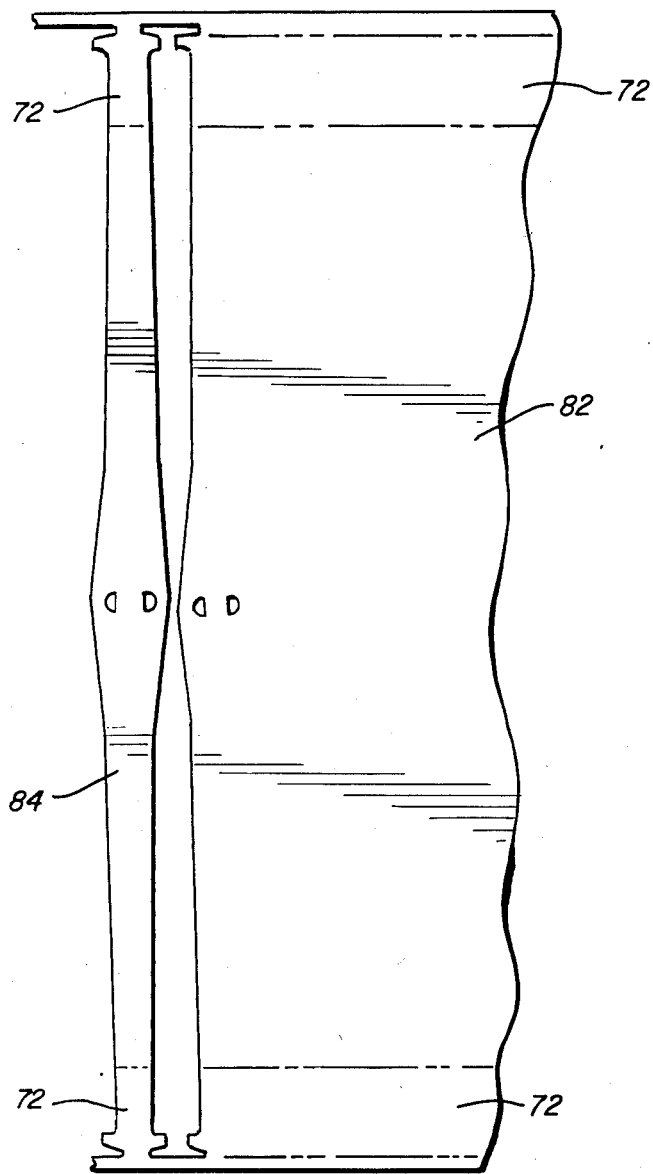
FIG. 7 is an enlarged, fragmentary, plan view of stock used to form a yoke of the superstructure of the windshield wiper blade assembly of FIG. 1, with the present invention incorporated.

Referring initially to FIGS. 1–3, a first conventional-type windshield wiper blade assembly is shown at 10 with the present invention incorporated. The assembly 10 comprises a wiper blade element 12 and an articulated, pressure distributing superstructure 14. The wiper blade assembly 10 is urged against a windshield surface (not shown) to be wiped, by a wiper arm 16 connected to the superstructure 14 by a connector 15. The pressure from the wiper arm 16 is transmitted through the elements of the superstructure 14 to the wiper blade element 12 for conforming a resilient wiper member or squeegee 18 of the wiper blade element 12 to the windshield surface so that upon movement of the arm 16 in a reciprocating path, the resilient wiper member or element 12 sweeps the windshield over a predetermined area.

The wiper blade element 12 consists of the aforementioned resilient wiper blade member or squeegee 18 and a flexible support member or flexor 20, which is generally made of either hard plastic or metal. The resilient wiper blade member or squeegee 18 has a free, wiping edge or lip 22 which directly contacts the windshield surface and an enlarged head portion 24 connected to the wiping edge 22 through a flexible hinge 28. The head portion 24 has oppositely opening longitudinal grooves 30, 32. The flexor 20 has a generally flat configuration so as to be flexible in a direction perpendicular to the surface to be wiped and to be substantially inflexible in the plane parallel to the surface to be wiped. The flexor 20 has a centrally disposed, elongate slot 38 bounded by two laterally spaced apart side rails 40, 42, which are assembled in the grooves 30, 32 in the squeegee 18 to hold the flexor 20 and squeegee 18 together in substantially fixed relationship.

The pressure distributing superstructure 14 consists of a primary pressure distributing yoke or bridge 44, which is connected at its ends 46 (one shown) to an intermediate portion of secondary yokes 48 (one shown). Each secondary yoke 48 has a pair of inwardly projecting, cooperating claws 50, 52, on the inboard and outboard end portions thereof, respectively. As seen in FIG. 3, each of the claws 52 has a free end 54 extending inwardly and under the planar surface 34 of the flexor 20 to retain the secondary yokes 48 against separation in a direction transverse to the plane of the flexor 20. The claws 50 are similarly configured. Structure such as conventional end clips or the like are provided on the wiper blade element 12 to prevent relative lengthwise removal of the secondary yokes 48 from the flexor 20, as is well known in the art.

Each secondary yoke 48 has an intermediate portion 56, to which one end 46 of the primary yoke 44 is removably attached for articulated movement of the primary yoke 44 relative to the secondary yoke 48 in the plane lying perpendicular to the surface to be wiped. Each end 46 of the primary yoke 44 has a cross section which may be V-shaped or U-shaped to conform generally to the cross-sectional shape of the underlying secondary yoke 48, and has inwardly projecting claws 58. The claws 58 nest in notches in the secondary yoke and cooperatively grasp the region of the secondary yoke at the juncture 59 between angled lengths 60, 62 of the secondary yoke 48.

The entire windshield wiper blade assembly 10 is moved reciprocatively by the driven wiper arm 16, which is pivotally connected to the primary yoke 44 through the connector 15.

Because the yokes 44, 48 are generally formed from metal, there is metal-to-metal contact at connection 66, between the primary and secondary yokes 44, 48 and at the connections 68 and 70 between the opposite ends of the secondary yoke 48 and the flexor 20, which is also either made from metal or hard plastic. Because the connections 66, 68, 70 between the primary yoke and secondary yoke and between the secondary yoke 48 and flexor 20 are generally loosely maintained, there is a tendency, due to the metal on metal at the connection, for there to be rattling during operation of the windshield wiping assembly. This is particularly true at the end of each wiping stroke of the blade. As the direction of the blade is reversed on the windshield the loose metal-to-metal connections click against each other as the direction of layover of the blade reverses.

To minimize the amount of noise developed at the connections 66, 68, 70, a sound insulating or sound deadening member 72 is interposed between the cooperating elements at the connections 66, 68, 70. FIG. 2 shows the connection 66 and the preferred location of the member 72 in the form of a tape. At the connection 66, the underlying, secondary yoke 48 has an outer, U- or V-shaped surface 74, which conventionally nests in a like-shaped surface 76 defined by the overlying primary yoke 44. The tape 72 maintains a slight spacing between the surfaces 74, 76 and is sufficiently resilient to absorb impact upon the primary and secondary yokes 44, 48 moving relative to each other in operation. The tape 72 acts as a cushion or insulation at the connection 66 and substantially eliminates rattling noises.

The tape 72 extends preferably entirely around the width of the inside surface 76 of the primary yoke 44 so that it covers the surface 78 of claws 58 curled under the secondary yoke 48 at the connection 66. The width of the tape is chosen so that throughout the anticipated range of movement of the primary yoke 44 relative to the secondary yoke 48, no metal-to-metal contact occurs between the yokes 44, 48.

Tape 72 is similarly disposed at each end of the secondary yoke 48 to completely cover the inside surface 80 of the yoke 48 that could otherwise come into direct contact with the flexor 20. The tape 72 extends over the surface 82 on the claws 52 so that direct contact between the claws 52 and planar surface 34 on the underside of the flexor 20 is prevented.

As an alternative to the aforementioned tape 72, a resilient or insulating coating can be applied strategically in those areas where there is potential metal-to-metal contact at the connections 66, 68, 70. The tape and/or coating can be applied to one or both of the cooperating elements at the connections 66, 68, 70. The tape and/or coating can be applied before or after the yokes 44, 48 are formed.

Preferably, the tape 72 or coating is applied before stamping and forming of the yokes 44, 48. In FIG. 7, sheet metal stock 82 of appropriate gauge and width, from which individual primary yoke blanks 84 are stamped, is shown. Preferably, a continuous length of the tape 72 is placed strategically, lengthwise of the stock 82 before stamping occurs. The tape or coating is adhered with sufficient strength that it will not release during the stamping or forming operations. Once the blank 84 is stamped, it can be formed, cleaned, deburred and polished in conventional manner with the tape and/or coating intact.

The placement of the tape or coating is very simply accomplished. To further facilitate the operation, the tape preferably has a pressure sensitive adhesive backing requiring only that the tape be pressed against the desired surface of the stock 82.

In a preferred form, the tape is a polyester material having a pressure sensitive adhesive backing. A suitable tape for this purpose is commercially available and manufactured by Minnesota Mining and Manufacturing and sold under their trademark VHB.

Figure 8:
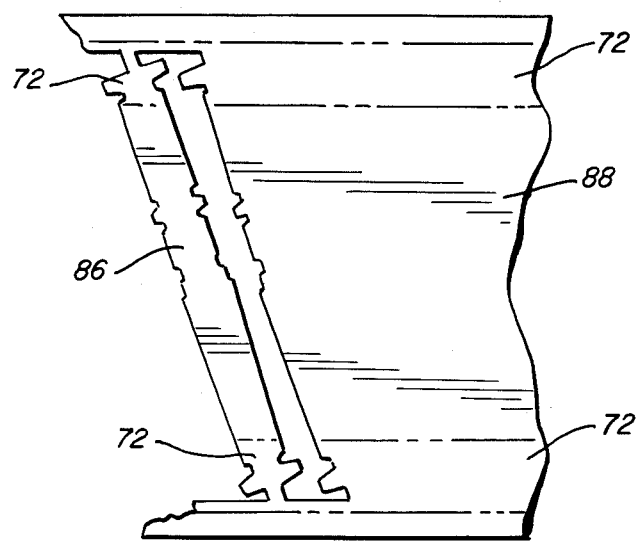
FIG. 8 is an enlarged, fragmentary, plan view of stock used to form one of the yokes of the superstructure of a windshield wiper blade assembly different than that in FIG. 4, with the present invention incorporated.

A different yoke configuration 86 for secondary yokes is shown stamped out of a piece of sheet metal stock 88 in FIG. 8. The principal of construction is the same as that for the primary yokes in FIG. 7. A tape 72 or coating is strategically placed on the stock 88 prior to the stamping and forming of the individual yoke parts. The blanks 86 in FIG. 8 are struck from the stock 88 at an angle so that with the blank folded about its centerline, the tape 72 or coating is located where needed.

FIGS. 4-6 show an alternative type of windshield wiper blade assembly, generally designated 90 in FIG. 4. The assembly 90 comprises a superstructure 92 with a primary yoke 94 and two cooperating secondary yokes 96, 98. The primary yoke 94 is substantially U-shaped, overlies U-shaped, secondary yoke 96, and is pivotally connected to the yoke 96 through a pin 100.

The inboard end 102 of the yoke 96 is connected to a midportion of the secondary yoke 98. The yoke 98 has recesses 104 which provide a seat for a pair of claws 106 on the yoke end 102. The outboard end 108 of the yoke 96 has claws 110 which are folded about oppositely projecting rails or flanges 112 from a body 114 on a one-piece plastic flexor 116.

The resilient wiper blade element includes the flexor 116, and associated wiping element or squeegee 118 in FIG. 6, which is a somewhat different style than the corresponding structure in the embodiment in FIGS. 1-3. This, however, does not affect the operation of the invention. Briefly, the body 114 of the flexor 116 defines a cavity 120 for reception of an enlarged head 122 on the squeegee 118. One interrupted wall 124 of the flexor 116 resides captively between the enlarged head 122 and an intermediate enlargement 126 on the squeegee 118. A wiping lip portion 128 is connected to the enlargement 126 through a hinge 130. The outboard end 108 of the yoke 96 is bent around each flexor rail or flange 112 in the shape of a U. The ends 132, 134 of the yoke 98 are connected to the flexor 116 in like fashion.

It can be seen that there are, in the FIG. 4 configuration, potentially five connections that produce noise—connection 136 between the primary yoke 94 and secondary yoke 96, connection 138 between the secondary yoke 96 and flexor 116, connection 140 between the secondary yoke 96 and the secondary yoke 98, and connections 146 and 148 between the ends of the yoke 98 and the flexor 116.

The tape 72 and/or coating is applied in similar fashion as in the previous embodiment. At the connection 136, as seen in FIG. 5, the tape 72 or coating is applied on the underside 146 of the primary yoke 94 which has substantially parallel side walls 148, 150 with surfaces 152, 154 facing the underlying and nested secondary yoke 96. The pin 100 is snugged at the connection 136 so that the tape 72 or coating is closely captured between the outwardly facing surfaces 156, 158 on the secondary yoke 96 and the facing surfaces 152, 154, respectively, on the primary yoke 94.

The tape 72 or coating applied across the entire width of the yoke 98 extends over and around the rails 112 and thus prevents direct contact of either leg 160, 162 of the U-shaped claws 110 with the rails 112. The connections 138, 148 are similar to the connection 146 and the connection 140 is substantially the same as the connection 66 in the previously described embodiment.

The attachment of the sound insulating or sound deadening tape or coating can be simply and inexpensively accomplished. At the same time, the tape and coating effectively diminish rattling that otherwise would occur in its absence and obviates the need for more expensive and complicated sound deadening structures.

We claim:

1. An improved windshield wiper blade assembly of the type having a wiper element and a superstructure carrying the wiper element, there being at least first and second pivotally interconnected elements on said windshield wiper blade assembly, the improvement characterized by:

means comprising a tape interposed between said first and second pivotally interconnected elements to prevent rattling therebetween.

2. The improved windshield wiper assembly according to claim 1 further including means for adhering the tape to at least one of the first and second interconnected elements.

3. The improved windshield wiper assembly according to claim 1 wherein said means comprises a tape with a pressure sensitive adhesive backing adhered to at least one of the first and second elements.

4. The improved windshield wiper assembly according to claim 1 wherein said means comprises a plastic tape and means adhering the plastic tape to at least one of the first and second elements.

5. The improved windshield wiper assembly according to claim 1 wherein said means comprises a polyester tape and means adhering the polyester tape to at least one of the first and second elements.

6. An improved windshield wiping assembly of the type having a wiper arm, a primary yoke, a secondary yoke, a wiper blade, first cooperating connecting means on the wiper arm and primary yoke to allow relative movement between the wiper arm and primary yoke, second cooperating connecting means on the primary yoke and secondary yoke to allow relative movement between the primary yoke and secondary yoke, and third cooperating connecting means on the secondary yoke and wiper blade, the improvement comprising:

resilient tape means interposed between at least one of the primary yoke and secondary yoke and secondary yoke and wiper blade to provide a cushion and thereby reduce noise developed between the primary and secondary yokes and wiper blade.

7. The improved windshield wiping assembly according to claim 6 wherein said resilient tape means comprises means adhering the tape to at least one of the primary yoke, secondary yoke and wiper blade.

8. The improved windshield wiping assembly according to claim 6 wherein said resilient means comprises a pressure sensitive adhesive tape adhered to at least one of the primary yoke, secondary yoke and wiper blade.

9. The improved windshield wiping assembly according to claim 6 wherein said resilient means comprises a plastic tape and means adhering the plastic tape to at least one of the primary yoke, secondary yoke and wiper blade.

10. The improved windshield wiping assembly according to claim 6 wherein said resilient means comprises a polyester tape and means adhering the polyester tape to at least one of the primary yoke, secondary yoke and wiper blade.

11. The improved windshield wiping assembly according to claim 6 wherein said resilient means comprises a sound deadening coating.

* * * * *